United States Patent
Dervaes

(10) Patent No.: US 12,523,595 B2
(45) Date of Patent: Jan. 13, 2026

(54) OMNI-STREAM NOZZLE

(71) Applicant: Hach Company, Loveland, CO (US)

(72) Inventor: Nelson E. Dervaes, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 1204 days.

(21) Appl. No.: 17/387,572

(22) Filed: Jul. 28, 2021

(65) Prior Publication Data

US 2023/0032774 A1 Feb. 2, 2023

(51) Int. Cl.
*G01N 21/25* (2006.01)
*B05B 1/06* (2006.01)
*B05B 1/34* (2006.01)
*G01N 21/15* (2006.01)

(52) U.S. Cl.
CPC .............. *G01N 21/251* (2013.01); *B05B 1/06* (2013.01); *B05B 1/34* (2013.01); *G01N 21/15* (2013.01)

(58) Field of Classification Search
CPC ........ G01N 21/251; G01N 21/15; B05B 1/06; B05B 1/34
See application file for complete search history.

(56) References Cited

U.S. PATENT DOCUMENTS

| 5,146,283 A | 9/1992 | Parnoff et al. |
| 2006/0125126 A1* | 6/2006 | Sherikar .............. B05B 7/0075 261/118 |

OTHER PUBLICATIONS

Applicants admitted prior art as shown in figure 4. (Year: 2021).*

* cited by examiner

*Primary Examiner* — Jill A Warden
*Assistant Examiner* — Alex Ramirez
(74) *Attorney, Agent, or Firm* — Ference & Associates LLC

(57) ABSTRACT

An embodiment provides a nozzle, including: a conical-shaped portion having a first end and a second end substantially opposite the first end, wherein the first end has a smaller diameter than the second end; the first end having an attachment to hold the nozzle in a flow of fluid from an inlet, wherein the nozzle is positioned with the first end facing an inflow of a fluid and the second end facing a chamber; and the conical-shaped portion configured to direct the inflow of the fluid along an inner surface of the chamber, wherein the inflow of the fluid travels around the outer diameter of the conical-shaped portion. Other aspects are described and claimed.

19 Claims, 4 Drawing Sheets

FLOW

OMNI-STREAM NOZZLE

FIELD

This application relates generally to the field of colorimeters, and, more particularly, to cleaning a chamber of a colorimeter.

BACKGROUND

A colorimeter measures the absorbance at a wavelength of light through a sample in a sample cuvette or vial. A colorimeter determines the concentration of a component in a liquid sample within a sample cuvette by projecting a light beam into the liquid sample within the cuvette. An absorbance for the given wavelength may then be measured. A concentration of the component of the sample may be measured as proportional to the absorbance. Different wavelengths may be selected based upon the species to be measured and specific applications.

A colorimeter may pass a light source through an aperture to a lens and/or a color filter. The wavelength of light may be selected for a given application. The light may then pass through a cuvette or sample cell/chamber. After passing through a cuvette the light may strike a photocell for a measurement of absorbance in the form of an output. The absorbance may be correlated to a concentration of the species to be measured in a sample.

BRIEF SUMMARY

In summary, one embodiment provides a nozzle, comprising: a conical-shaped portion having a first end and a second end substantially opposite the first end, wherein the first end has a smaller diameter than the second end; the first end having an attachment to hold the nozzle in a flow of fluid from an inlet, wherein the nozzle is positioned with the first end facing an inflow of a fluid and the second end facing a chamber; and the conical-shaped portion configured to direct the inflow of the fluid along an inner surface of the chamber, wherein the inflow of the fluid travels around the outer diameter of the conical-shaped portion.

Another embodiment provides a colorimeter measurement chamber, comprising: an inlet; a chamber; and a nozzle; wherein the nozzle comprises a conical-shaped portion having a first end and a second end substantially opposite the first end, wherein the first end has a smaller diameter than the second end, the first end having an attachment to hold the nozzle in a flow of fluid from the inlet, wherein the nozzle is positioned with the first end facing an inflow of a fluid and the second end facing the chamber; and the conical-shaped portion configured to direct the inflow of the fluid along an inner surface of the chamber, wherein the inflow of the fluid travels around the outer diameter of the conical-shaped portion.

A further embodiment provides a method for directing a flow of fluid in a colorimeter, comprising: placing a nozzle in an inlet of a chamber of the colorimeter, wherein the nozzle comprises a conical-shaped portion having a first end and a second end substantially opposite the first end, wherein the first end has a smaller diameter than the second end, the first end having an attachment to hold the nozzle in a flow of fluid from an inlet, wherein the nozzle is positioned with the first end facing an inflow of a fluid and the second end facing a chamber; and the conical-shaped portion configured to direct the inflow of the fluid along an inner surface of the chamber, wherein the inflow of the fluid travels around the outer diameter of the conical-shaped portion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
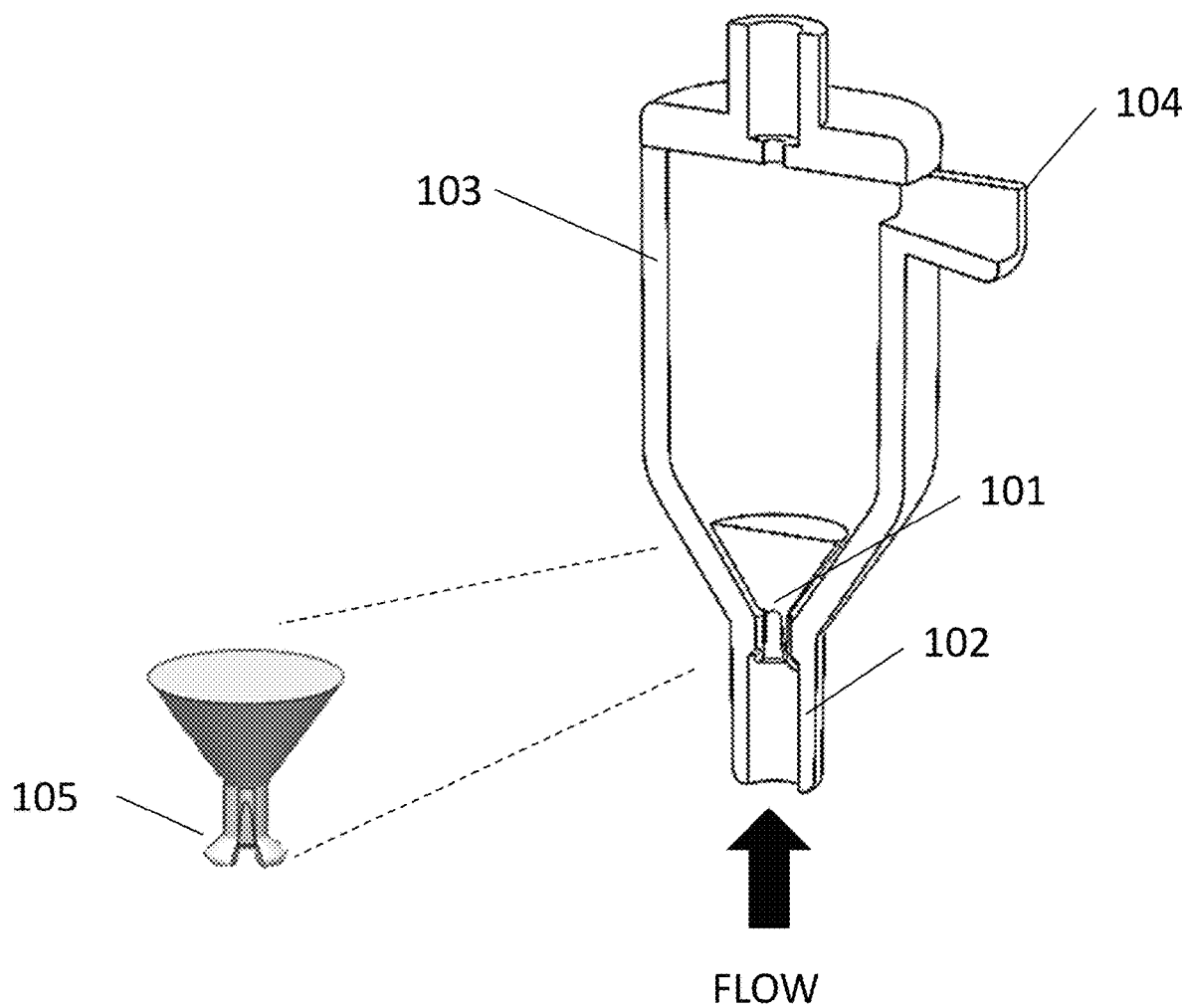
FIG. 1 illustrates an example embodiment cutaway view of an omni-stream nozzle of a colorimeter.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional methods and systems for measuring absorbance using a colorimeter includes the colorimeter utilizing a light source to generate a light beam, which may be a beam of a given wavelength. A sample of fluid may be placed in a cuvette, sample cell, sample vessel, or the like for measurement of a component in the sample. The measurement beam may be axially directed into a sample cell. The sample cell may have a window to allow the passage of light through the sample cell so that the light beam of the colorimeter can infiltrate, and pass through the sample cell. In some embodiments of a colorimeter, a sample cell may be a one-time use vessel. This may allow a user to either use a fresh cell for each measurement or clean a cell prior to a subsequent use. However, some embodiments of a colorimeter may utilize a flow through design in which a sample enters a cell or vessel for measurement. For example, a sample may flow into the cell or vessel for a measurement, and a drain may allow the sample to exit the cell. The flow may be continuous or a stop flow design. In this embodiment, a sample cell or vessel may be used for multiple measurements over time.

In a continuous flow design, the measurement cell or vessel may continuously contain a liquid sample. There may not be a cleaning between each measurement cycle. The continuous aqueous environment may allow fouling or buildup of material on the inside surface of the vessel or cell. Colorimeters may measure from samples taken from various sources. These sample sources may include a sample containing contaminates from particulate, biological, or the like. Even relatively clean sample may build up a biofilm in a vessel if given enough time. Sample sources such as industrial waste, natural bodies of water, holding tanks, or the like may accelerate biofilm production.

Figure 4:
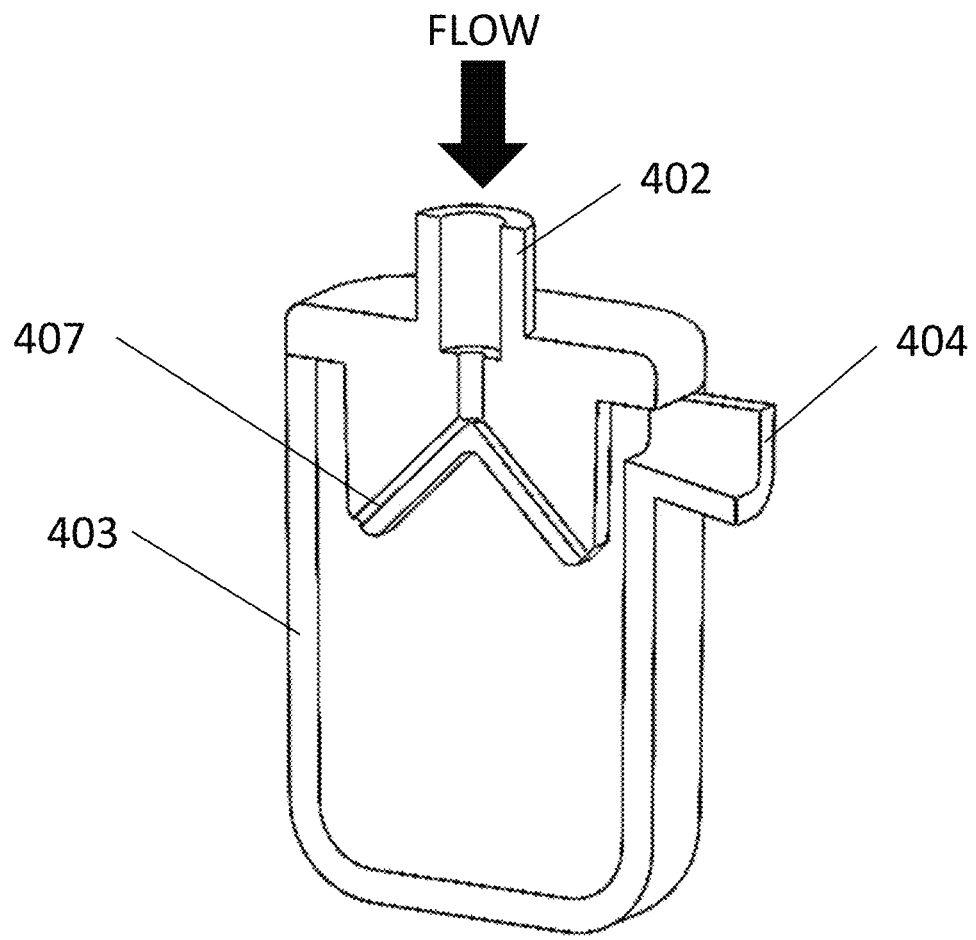
FIG. 4 illustrates a prior art embodiment cutaway view of a colorimeter.

The sample cell or vessel may be a can or cylinder-shaped vessel. The sample vial is typically transparent such that light from a light source may enter and exit the sample cell with a light path through the sample to be measured. One limitation of a conventional colorimeter may be the residue or buildup of particulate matter and or biofilm in a sample vessel. Referring to FIG. 4, one conventional approach to reduce buildup has been an inlet 402 for the sample that directs fluid through a channel 407, and the channel may flow fluid toward an area of the cell 403 in which light may enter and/or exit the cell. The fluid may exit the cell through a drain 404. This embodiment of a colorimeter may have an optical cell with an inlet through the lid and a drain at the top with two small holes are drilled in the lid to form dual nozzles or channels that direct the sample down and along the sidewalls. Such a configuration only cleans the primary optical surfaces and pushes air bubbles down. Thus, the configuration allows sample flow path to reduce biofilm and air bubbles only in two discrete areas of the cell.

However, this design allows buildup on the inside surface of the cell in other areas which may continue to grow and overwhelm the areas service by the channel and allow for buildup to even break off and mix with a sample for measurement. Colorimeters, by design, are for a purpose of measuring a component using a given wavelength of light in a liquid sample. Thus, the introduction of fluids with particulate may introduce barriers to the passage of the light in a sample vessel, thereby fouling the colorimeter and decreasing accuracy of a measurement. Colorimeters may be automated, perform multiple cycles, or the like. Colorimeters may experience a buildup of particulate matter in a sample cell thereby causing inaccurate measurements. The buildup may stick to an inner surface of the sample cell. A buildup on the inside or outside of a sample cell may obstruct light passing into or out of the sample cell. Since the absorbance of light of a sample is correlated to a concentration of a species in a sample, leftover buildup from a past sample may affect further measurements. Biofilm and air bubbles can create problems with the optical measurements in colorimeters. Sample flow across the optical surfaces may prevent, or slow down, biofilm growth on the optical surfaces. Air bubbles tend to stick to the walls of the colorimeter and may block light. This is even more likely if biofilm has grown on the colorimeter walls.

The buildup may be sand, iron, debris, fouling from organic growth, chemistry-based interferences, or the like. Certain conditions may allow particulate matter to remain in a sample cell. For example, if a flow rate is low, the particulates may remain in the sample cell. As another example, heavy particulates may accumulate in a sample cell. Particles may remain and block the entry light beam and/or scattered light. Residual particulate may lead to persistent inaccurate readings. Even if a system has a flushing mechanism, the buildup of particulate may overwhelm the system and/or cause an obstruction or diffusion of the light path. What is needed is a system and method to reduce buildup from a sample cell of a colorimeter without altering the normal function of the colorimeter. The described nozzle may deliver fresh sample to the measurement chamber of the colorimeter cell. For best accuracy, the nozzle may deliver a sample in a way that thoroughly rinses the old sample out of the measurement chamber so there is little or no remaining previous sample. An additional benefit may be to deliver the sample in a manner that eliminates or reduces air bubbles and/or moves bubbles out of the optical path. A further benefit may be to reduce dirt or biofilm from attaching to the colorimeter walls.

Accordingly, an embodiment provides a device and method for a nozzle for a colorimeter. In an embodiment, the nozzle may be placed in an inlet to a cell, vessel, or measurement chamber of a colorimeter. The nozzle may have a first end and a second end opposite the first end. Between the first and second end may be a conical-shaped portion. The first end diameter may be smaller than the second end diameter. The nozzle may be shaped to direct a flow of a fluid around the inside surface of the cell or vessel. The nozzle may have an attachment at the first end. The attachment may be a snap, tab, ring, screw, bolt, press fit, thermal welding, or the like. The nozzle may have fins or ridges on the surface of the conical-shaped portion to stand the nozzle off from the inlet and/or vessel wall. The nozzle may be fixed or rotatable along the longitudinal axis of the nozzle. The second end may have one or more fins or vanes on the surface. The fins or vanes may stir fluid in the vessel as the nozzle rotates. The flow of the fluid may rotate nozzle.

The illustrated example embodiments will be best understood by reference to the figures. The following description is intended only by way of example, and simply illustrates certain example embodiments.

Referring to FIG. 1, an example device and method for a nozzle 101 is illustrated. In an embodiment, the nozzle may be placed in an inlet 102 for a colorimeter. In an embodiment, the nozzle may be in the inlet, a portion of a measurement cell or vessel, or combination thereof. The nozzle may be in a location that may be a transition from an inlet to the cell or vessel 103. The sample may exit the cell through a drain 104. In an embodiment, the nozzle may be placed in a flow, influx, or stream of a sample fluid. The nozzle may direct the flow of the sample fluid. The nozzle may direct the flow of the sample toward or along the inner surface of the cell. In an embodiment, the nozzle may direct the sample flow in an omnidirectional manner. In an embodiment, the nozzle may direct sample flow in a 360° direction. In other words, the incoming sample flow may be directed around the inner surface of the measurement cell or vessel. In an embodiment, the nozzle directed flow reduces or eliminate biofilm or other buildup that may form on the inner surface of the cell, chamber, or vessel which may impair accurate colorimeter measurement.

In an embodiment, the nozzle may be made of a plastic. The plastic may be molded, injection molded, molded in parts and assembled or heat welded, or the like. Other materials may be used such as metal, fiberglass, composite, or the like. In an embodiment, the nozzle may have a first end and a second end opposite the first end. A conical-shaped portion may be positioned between the first and the second ends. The first end may have a smaller diameter than the second end. The first end may face the inflow or influx of a sample flow. In other words, the first end may fit into an inlet or a transition area of the inlet to a cell or vessel. The second end may face the space contained by the cell or vessel.

In an embodiment, the first end may have an attachment means to hold the nozzle in place (See FIG. 1). In other words, the nozzle may be affixed such that the flow of a sample does not dislodge the nozzle from a position near the inlet. In an embodiment, the attachment may be tabs 105. The one of more snaps or tabs may be molded with the body of the nozzle. As an example, the attachment may be snaps or tabs with a portion flared to a great diameter (See FIG. 1 exploded view). The snaps or tabs may allow the nozzle to be pushed and locked into place. An example of tabs or snaps are illustrative, and other attachment structures are disclosed. For example, a locking ring, other tabs structures, press fit structure, or the like may be used. In an embodiment, the attachment may allow the nozzle to rotate about the longitudinal axis of the nozzle. In another embodiment, the attachment may fix the nozzle such that rotational movement is not allowed.

In an embodiment, a gap may be defined between the outside diameter of the nozzle and other structures of the colorimeter. For example, a gap may exist between the conical-shaped portion outer surface or diameter and the inner diameter of the inlet, cell, or inlet to cell transition area. The gap allows the sample to flow around the nozzle. The sample may then flow around the nozzle and along the inner surface of the cell or vessel. In an embodiment, the spacing or gap may be created by manufacturing a nozzle with an outer diameter complementary to an inner surface of the location of installation. The flow of the sample around the nozzle may maintain proper spacing between the nozzle and inlet/cell inner surfaces.

In an embodiment, fins of vanes may be on the outer surface of the nozzle to maintain spacing. For example, a molded plastic nozzle may have fins or vanes molded in place. The fins or vanes may be located of the surface of the conical-shaped portion. The fins or vanes may have a height off the surface of the nozzle to provide proper spacing and allow fluid flow around the nozzle. In an embodiment, the fins or vanes may be positioned along the longitudinal axis of the nozzle. In other words, parallel to a flow direction. In an embodiment, the fins or vanes may be oriented in a corkscrew configuration such that the flow of fluid around the nozzle impinges upon the fins or vanes to cause a rotation of the nozzle in a longitudinal direction.

In an embodiment, a colorimeter may comprise an optical cell with an inlet in the bottom and a drain at the top (See FIG. 1). A conical plug in the bottom of the cell may form a nozzle for the sample that flows up and along the sidewalls with almost a full 360° coverage. Spacers, fins, or vanes along the conical sides of the plug may be needed. This sample flow path may reduce the impact of biofilm and air bubbles in the cell. The conical-shaped nozzle may be snapped, press fit, or welded into the colorimeter cell.

Figure 2:
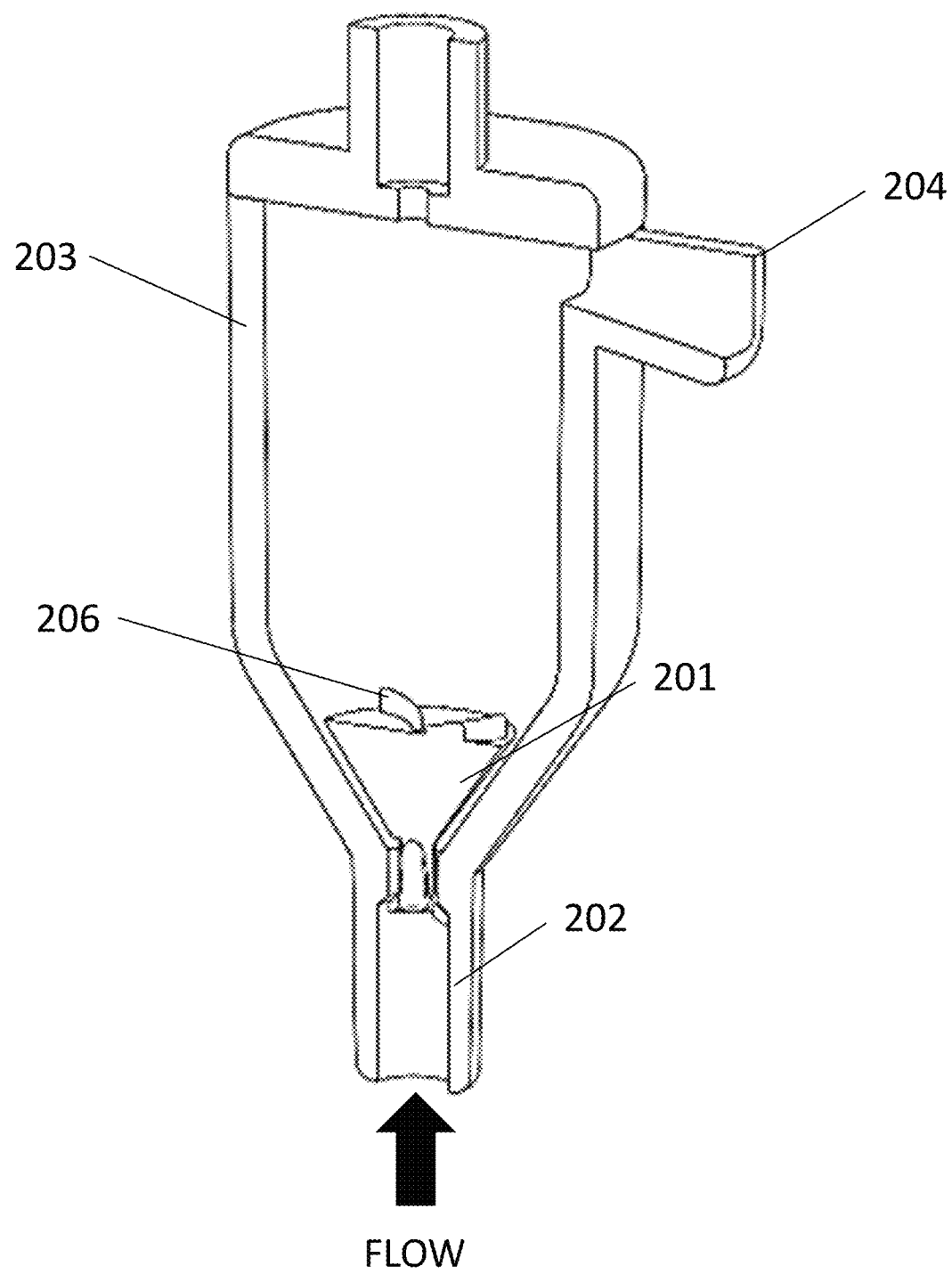
FIG. 2 illustrates another example embodiment cutaway view of another omni-stream nozzle of a colorimeter.

Referring to FIG. 2, in an embodiment, the second end of the nozzle 201 may have a flat and circular surface facing the inner lumen defined by the cell or vessel 203 with stir bars 206. The surface of the second end may have stir bars, fins, or vanes on the surface extending toward the lumen of the cell. For example, the stir bars may radiate axially from the center of the second end surface outward toward the outer circumference of the surface. The stir bars may be straight, curved, or any variable curvature. In an embodiment, the nozzle may be placed in an inlet 202 of a cell or a transition area from the inlet to the cell. Sample may exit the cell through a drain 204. In an embodiment, a longitudinal rotation of the nozzle may turn the stirs bars and disrupt the fluid within the cell or vessel. In other words, the stir bars may agitate the fluid in the cell or vessel. The agitation may assist in proper mixing of reagents for colorimetric measurement and/or reduction of biofilm on the inner surface of the cell or vessel. In an embodiment, a stir bar may be driven by the flow of the sample fluid. In an embodiment, a stir bar may be driven by another means, such as an electromagnetic force. In an embodiment, the stir bar may rotate at a time when a sample is not flowing, for example, after a reagent addition to the sample.

In an embodiment a colorimeter may comprise an optical cell with an inlet in the bottom and a drain at the top of the cell (See FIG. 2). A conical component or conical-shaped nozzle may rest in the bottom of the cell to form a nozzle for the sample flowing up and along the sidewalls with a full 360° coverage. The nozzle may rotate to fully distribute the sample onto the colorimeter walls and mix the sample. This sample flow path should reduce the impact of biofilm and air bubbles in the cell.

Figure 3:
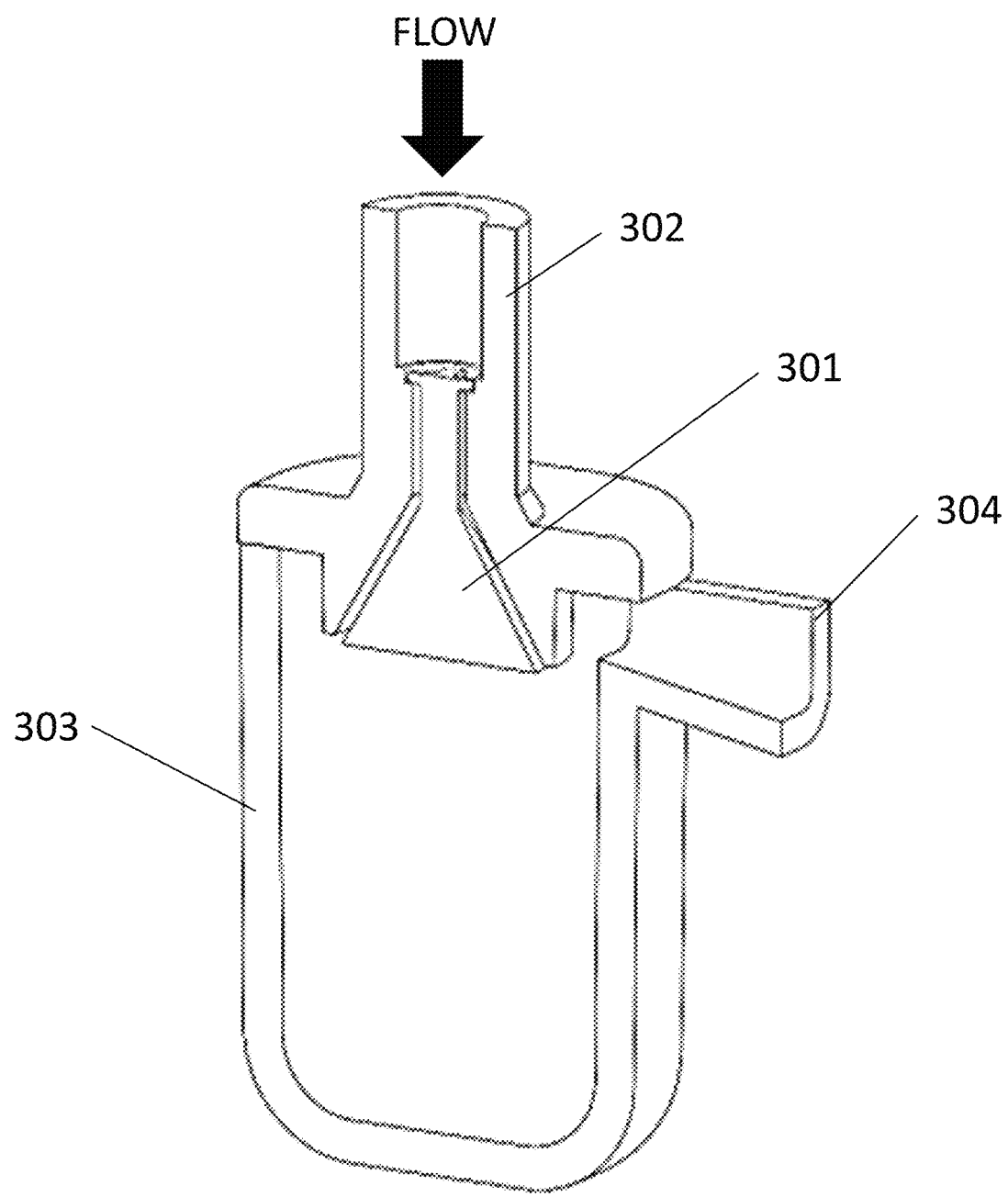
FIG. 3 illustrates a further example embodiment cutaway view of a further omni-stream nozzle of a colorimeter.

Referring to FIG. 3, in an embodiment, a nozzle 301 may be placed at the top of a colorimeter cell. The nozzle may be placed in or near the inlet 302 of a cell or vessel 303. This embodiment of a colorimeter may comprise an optical cell with an inlet in the lid and a drain 304 at the top. A conical plug in the bottom of the lid, and top of the cell, forms a nozzle for the sample that flows down and along the sidewalls with almost a full 360° coverage. Spacers, fins, or vanes along the conical sides of the plug may be needed. This sample flow path may reduce the impact of biofilm and air bubbles in the cell.

The device and method may determine a proper flow, quality of an inflowing measurement sample, suggest a frequency of cleaning, or the like, in order optimize the removal of the buildup in a sample cell. The system may have flow sensors, fluid level sensors, light sensors, or any sensor to identify a build-up in a sample cell. For example, the system may be programmed that given certain parameters, such as a comparison of emitted to absorbed light, clarity of the sample, flow rate, number of cycles of measurement, or the like. The data from the sensor may be fed to the system to determine if a proper cleaning of the sample cell is performed. The system may also monitor a plurality of colorimeters in one or more locations. The system may collect data such as number of cycles, time, location, or the like. Such information may make recommendations on the need to operational parameters to achieve reduction or elimination of buildup in a cell.

Measurement of buildup of a sample cell may be at periodic intervals set by the user or preprogrammed frequencies in the device. Information related to a cleaning may be output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of buildup in a cell, a need for cleaning, a need for servicing the device, or the like. An embodiment may use a system to shut down the assembly during periods of unacceptable parameters, limits, or thresholds, for example, if an assembly is faulty, a cell is too dirty, an assembly can no longer function properly, or the like.

If the device is outside acceptable parameters, the system may take corrective action. For example, the system may provide an input to shunt or increase flow, further clean a measurement cell, or the like. In an embodiment, an assembly may service multiple colorimeters. In an embodiment, the system may "change out" a device automatically, for example, rerouting sample to a cleaner cell, in the case that a device is outside acceptable parameters.

Additionally or alternatively, the system may output an alarm, log an event, or the like. An alert may be in a form of audio, visual, data, storing the data to a memory device, sending the output through a connected or wireless system, printing the output or the like. The system may log information such as the device location, a corrective action, geographical location, time, date, number of measurement cycles, rate of flow, volume of fluid, a log of the type of fluid being delivered, or the like. The alert or log may be automated, meaning the system may automatically output whether a correction was required or not. The system may also have associated alarms, limits, or predetermined thresholds. For example, if cleaning of the sample cell reaches or falls below a threshold or limit. Alarms or logs may be analyzed in real-time, stored for later use, or any combination thereof.

The various embodiments described herein thus represent a technical improvement to conventional colorimeters. Using the techniques as described herein, an embodiment may use a device and method to assist in keeping a colorimeter measurement cell clean from biofilm and/or other buildup, and/or less susceptible to entrained air bubble. This is in contrast to conventional methods with limitations mentioned above. Such techniques provide a better device and method to clean a colorimeter.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of a colorimeter.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand-held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A nozzle, comprising:
   a conical-shaped portion having a first end and a second end opposite the first end, wherein the first end has a smaller diameter than the second end;
   the first end having an attachment to hold the nozzle in a flow of fluid from an inlet, wherein the nozzle is positioned with the first end facing an inflow of a fluid and the second end facing a chamber; and
   the conical-shaped portion configured to direct the inflow of the fluid along an inner surface of the chamber, wherein the inflow of the fluid travels around the outer diameter of the conical-shaped portion, wherein the outer diameter of the conical-shaped portion is shaped complementary to the inner surface of the chamber.

2. The nozzle of claim 1, wherein the attachment is selected from the group consisting of: a snap, tab, ring, screw, bolt, press fit, and thermal welding.

3. The nozzle of claim 1, wherein the outer diameter of the conical-shaped portion further comprises spacers opposite the inner surface of the chamber creating a gap between the nozzle and the surface of the chamber.

4. The nozzle of claim 1, wherein the nozzle is rotatable along a longitudinal axis.

5. The nozzle of claim 1, wherein the outer diameter of the conical-shaped portion further comprises a plurality of vanes configured to rotate the nozzle from the inflow of the fluid.

6. The nozzle of claim 1, wherein a surface of the second end further comprises a plurality of stir bars, wherein the plurality of stir bars are configured to stir the fluid in the chamber.

7. The nozzle of claim 1, wherein an electromagnetic force rotates the nozzle along the longitudinal axis.

8. The nozzle of claim 1, wherein the inflow of the fluid along an inner surface of the chamber reduces biofilm on the inner surface of the chamber.

9. The nozzle of claim 1, wherein the chamber is a measurement cell of a colorimeter.

10. A colorimeter measurement chamber, comprising:
an inlet;
a chamber; and
a nozzle;
wherein the nozzle comprises a conical-shaped portion having a first end and a second end opposite the first end, wherein the first end has a smaller diameter than the second end, the first end having an attachment to hold the nozzle in a flow of fluid from the inlet, wherein the nozzle is positioned with the first end facing an inflow of a fluid and the second end facing the chamber; and the conical-shaped portion configured to direct the inflow of the fluid along an inner surface of the chamber, wherein the inflow of the fluid travels around the outer diameter of the conical-shaped portion, wherein the outer diameter of the conical-shaped portion is shaped complementary to the inner surface of the chamber.

11. The colorimeter measurement chamber of claim 10, wherein the attachment is selected from the group consisting of: a snap, tab, ring, screw, bolt, press fit, and thermal welding.

12. The colorimeter measurement chamber of claim 10, wherein the outer diameter of the conical-shaped portion further comprises spacers opposite the inner surface of the chamber creating a gap between the nozzle and the surface of the chamber.

13. The colorimeter measurement chamber of claim 10, wherein the nozzle is rotatable along a longitudinal axis.

14. The colorimeter measurement chamber of claim 10, wherein the outer diameter of the conical-shaped portion further comprises a plurality of vanes configured to rotate the nozzle from the inflow of the fluid.

15. The colorimeter measurement chamber of claim 10, wherein a surface of the second end further comprises a plurality of stir bars, wherein the plurality of stir bars are configured to stir the fluid in the chamber.

16. The colorimeter measurement chamber of claim 10, where an electromagnetic force rotates the nozzle along the longitudinal axis.

17. The colorimeter measurement chamber of claim 10, wherein the inflow of the fluid along an inner surface of the chamber reduces biofilm on the inner surface of the chamber.

18. The nozzle of claim 10, wherein the inflow of the fluid along an inner surface of the chamber reduces biofilm on the inner surface of the chamber.

19. A method for directing a flow of fluid in a colorimeter, comprising:
placing a nozzle in an inlet of a chamber of the colorimeter, wherein the nozzle comprises a conical-shaped portion having a first end and a second end substantially opposite the first end, wherein the first end has a smaller diameter than the second end, the first end having an attachment to hold the nozzle in a flow of fluid from an inlet, wherein the nozzle is positioned with the first end facing an inflow of a fluid and the second end facing a chamber; and the conical-shaped portion configured to direct the inflow of the fluid along an inner surface of the chamber, wherein the inflow of the fluid travels around the outer diameter of the conical-shaped portion.

* * * * *